United States Patent
Weng et al.

(10) Patent No.: US 6,199,088 B1
(45) Date of Patent: Mar. 6, 2001

(54) CIRCUIT FOR DETERMINING MULTIPLICATIVE INVERSES IN CERTAIN GALOIS FIELDS

(75) Inventors: Lih-Jyh Weng, Shrewsbury; Diana Langer, Northboro, both of MA (US)

(73) Assignee: Quantum Corp., Milpitas, CA (US)

( * ) Notice: Subject to any disclaimer, the term of this patent is extended or adjusted under 35 U.S.C. 154(b) by 0 days.

(21) Appl. No.: 09/108,170

(22) Filed: Jun. 30, 1998

(51) Int. Cl.[7] ............................................. G06F 7/00
(52) U.S. Cl. ............................................. 708/492
(58) Field of Search ........................... 708/491, 492, 708/650, 653, 654

(56) References Cited

U.S. PATENT DOCUMENTS

| | | | |
|---|---|---|---|
| 4,975,867 | * 12/1990 | Weng | 708/492 |
| 4,989,171 | * 1/1991 | Hollmann | 708/492 |
| 5,612,910 | * 3/1997 | Meyer | 708/492 |
| 5,890,800 | * 4/1999 | Meyer | 708/492 |

* cited by examiner

Primary Examiner—Chuong Dinh Ngo
(74) Attorney, Agent, or Firm—Patricia A. Sheehan

(57) ABSTRACT

A system for producing a quotient B/A, where A and B are elements of $GF(2^{2M})$, $2M+1$ is prime and 2 is a primitive element of $GF(2M+1)$, first determines $A^{-1}$ and then multiplies B by $A^{-1}$. The system uses a $(2M+1)$-bit representation for A and produces, directly from A, an element $C=A^{2^M+1}$, where C also is an element of $GF(2^{2M})$ which is a subfield of $GF(2^M)$. The system produces $M+1$ bits to represent C by performing bit manipulations that are equivalent to permuting the $(2M+1)$-bits to produce $A^{2^M}$ and multiplying the permuted bits by A. The bit manipulations are: $c_0 = \Sigma a_i a_i$; $c_1 = \Sigma a_i a_{i+1}$ ... $c_M = \Sigma a_i a_{i+M}$ where the $a_j$'s and $c_j$'s are the coefficients of A and C, respectively. The system retrieves $C^{-1}$ from a $(2^M-1)$-element lookup table and multiplies $C^{-1}=A^{-2^M+1}$ by $A^{2^M}$ to produce $A^{-1}$. This multiplication is performed as the exclusive-OR'ing of $M+1$ sums of cyclically shifted copies of $A^{2^M}$, which is a permutation of the $2^M+1$ bits of A. The multiplication of B by $A^{-1}$ is also performed as the exclusive-OR'ing of cyclically shifted copies of a $(2M+1)$-bit representation of B.

27 Claims, 4 Drawing Sheets

Table 1: Values of m for $GF(2^m)$ with irreducible polynomial
$x^m + x^{m-1} + x^{m-2} + \ldots + x^3 + x^2 + x + 1$:

| | | | | | | | | | |
|---|---|---|---|---|---|---|---|---|---|
| 2 | 4 | 10 | 12 | 18 | 28 | 36 | 52 | 58 | 60 |
| 66 | 82 | 100 | 106 | 130 | 138 | 148 | 162 | 172 | 178 |
| 180 | 196 | 210 | 226 | 268 | 292 | 316 | 346 | 348 | 372 |
| 378 | 388 | 418 | 420 | 442 | 460 | 466 | 490 | 508 | 522 |
| 540 | 546 | 556 | 562 | 586 | 612 | 618 | 652 | 658 | 660 |
| 676 | 700 | 708 | 756 | 772 | 786 | 796 | 820 | 826 | 828 |
| 852 | 858 | 876 | 882 | 906 | 940 | 946 | 1018 | 1060 | 1090 |
| 1108 | 1116 | 1122 | 1170 | 1186 | 1212 | 1228 | 1236 | 1258 | 1276 |
| 1282 | 1290 | 1300 | 1306 | 1372 | 1380 | 1426 | 1450 | 1452 | 1482 |
| 1492 | 1498 | 1522 | 1530 | 1548 | 1570 | 1618 | 1620 | 1636 | 1666 |
| 1668 | 1692 | 1732 | 1740 | 1746 | 1786 | 1860 | 1866 | 1876 | 1900 |
| 1906 | 1930 | 1948 | 1972 | 1978 | 1986 | 1996 | 2026 | 2028 | 2052 |
| 2068 | 2082 | 2098 | 2130 | 2140 | 2212 | 2220 | 2236 | 2242 | 2266 |
| 2268 | 2292 | 2308 | 2332 | 2338 | 2356 | 2370 | 2388 | 2436 | 2458 |
| 2466 | 2476 | 2530 | 2538 | 2548 | 2556 | 2578 | 2620 | 2658 | 2676 |
| 2682 | 2692 | 2698 | 2706 | 2740 | 2788 | 2796 | 2802 | 2818 | 2836 |
| 2842 | 2850 | 2860 | 2908 | 2938 | 2956 | 2962 | 3010 | 3018 | 3036 |
| 3066 | 3082 | 3186 | 3202 | 3252 | 3298 | 3306 | 3322 | 3346 | 3370 |
| 3412 | 3460 | 3466 | 3468 | 3490 | 3498 | 3516 | 3532 | 3538 | 3546 |
| 3556 | 3570 | 3580 | 3612 | 3636 | 3642 | 3658 | 3676 | 3690 | 3700 |
| 3708 | 3732 | 3778 | 3796 | 3802 | 3850 | 3852 | 3876 | 3906 | 3916 |
| 3922 | 3930 | 3946 | 3988 | 4002 | 4012 | 4018 | 4020 | 4090 | 4092 |
| 4098 | 4132 | 4138 | 4156 | 4218 | 4228 | 4242 | 4252 | 4258 | 4260 |
| 4282 | 4348 | 4356 | 4362 | 4372 | 4396 | 4450 | 4482 | 4492 | 4506 |
| 4516 | 4546 | 4602 | 4620 | 4636 | 4690 | 4722 | 4786 | 4788 | 4812 |
| 4876 | 4932 | 4956 | 4972 | 4986 | 5002 | 5010 | 5050 | 5058 | 5076 |
| 5098 | 5106 | 5146 | 5170 | 5178 | 5188 | 5226 | 5260 | 5308 | 5332 |
| 5386 | 5442 | 5476 | 5482 | 5500 | 5506 | 5556 | 5562 | 5572 | 5650 |
| 5658 | 5682 | 5692 | 5700 | 5716 | 5740 | 5748 | 5778 | 5812 | 5826 |
| 5842 | 5850 | 5868 | 5922 | 5938 | 5986 | 6010 | 6028 | 6052 | 6066 |
| 6100 | 6130 | 6172 | 6196 | 6202 | 6210 | 6228 | 6268 | 6276 | 6298 |
| 6316 | 6322 | 6372 | 6378 | 6388 | 6396 | 6468 | 6490 | 6546 | 6618 |
| 6636 | 6652 | 6658 | 6690 | 6700 | 6708 | 6732 | 6762 | 6778 | 6780 |
| 6802 | 6826 | 6828 | 6868 | 6882 | 6898 | 6906 | 6916 | 6946 | 6948 |
| 6970 | 7012 | 7018 | 7026 | 7042 | 7068 | 7108 | 7186 | 7210 | 7218 |
| 7228 | 7236 | 7242 | 7252 | 7282 | 7306 | 7330 | 7348 | 7410 | 7450 |
| 7458 | 7476 | 7498 | 7506 | 7516 | 7522 | 7540 | 7546 | 7548 | 7572 |
| 7588 | 7602 | 7620 | 7642 | 7668 | 7690 | 7716 | 7756 | 7788 | 7828 |
| 7852 | 7876 | 7882 | 7900 | 7906 | 7932 | 7948 | 8052 | 8068 | 8092 |
| 8116 | 8122 | 8146 | 8170 | 8178 | 8218 | 8220 | 8236 | 8242 | 8268 |
| 8290 | 8292 | 8362 | 8386 | 8428 | 8442 | 8466 | 8538 | 8562 | 8572 |
| 8596 | 8626 | 8668 | 8676 | 8692 | 8698 | 8730 | 8740 | 8746 | 8802 |

*FIG. 1A*

| | | | | | | | | | |
|---|---|---|---|---|---|---|---|---|---|
| 8818 | 8820 | 8836 | 8860 | 8866 | 8922 | 8932 | 8962 | 8970 | 9010 |
| 9028 | 9058 | 9172 | 9180 | 9202 | 9220 | 9226 | 9282 | 9292 | 9322 |
| 9340 | 9348 | 9370 | 9396 | 9418 | 9420 | 9436 | 9466 | 9490 | 9532 |
| 9538 | 9546 | 9586 | 9612 | 9618 | 9628 | 9642 | 9660 | 9676 | 9732 |
| 9748 | 9802 | 9850 | 9858 | 9882 | 9900 | 9906 | 9922 | 9940 | 9948 |
| 10036 | 10066 | 10068 | 10090 | 10092 | 10098 | 10132 | 10138 | 10140 | 10162 |
| 10180 | 10252 | 10258 | 10266 | 10300 | 10330 | 10356 | 10426 | 10458 | 10476 |
| 10498 | 10500 | 10588 | 10612 | 10666 | 10690 | 10708 | 10722 | 10732 | 10788 |
| 10836 | 10852 | 10858 | 10860 | 10866 | 10882 | 10890 | 10908 | 10948 | 10972 |
| 10978 | 10986 | 11002 | 11026 | 11068 | 11082 | 11092 | 11130 | 11170 | 11196 |
| 11212 | 11260 | 11316 | 11436 | 11442 | 11482 | 11548 | 11578 | 11586 | 11620 |
| 11676 | 11698 | 11716 | 11778 | 11788 | 11812 | 11820 | 11826 | 11866 | 11908 |
| 11932 | 11938 | 11980 | 11986 | 12010 | 12042 | 12106 | 12148 | 12156 | 12196 |
| 12202 | 12210 | 12226 | 12250 | 12252 | 12268 | 12276 | 12300 | 12322 | 12346 |
| 12372 | 12378 | 12412 | 12436 | 12490 | 12538 | 12546 | 12588 | 12610 | 12612 |
| 12618 | 12636 | 12652 | 12658 | 12738 | 12756 | 12762 | 12780 | 12820 | 12828 |
| 12898 | 12906 | 12916 | 12922 | 12940 | 12978 | 13036 | 13042 | 13108 | 13146 |
| 13162 | 13186 | 13228 | 13290 | 13330 | 13338 | 13396 | 13410 | 13450 | 13468 |
| 13476 | 13522 | 13612 | 13618 | 13626 | 13690 | 13708 | 13722 | 13756 | 13762 |
| 13828 | 13858 | 13876 | 13882 | 13900 | 13906 | 13930 | 13932 | 13996 | 14010 |
| 14050 | 14106 | 14172 | 14220 | 14242 | 14340 | 14386 | 14388 | 14410 | 14418 |
| 14460 | 14532 | 14548 | 14556 | 14620 | 14626 | 14628 | 14652 | 14668 | 14698 |
| 14716 | 14722 | 14740 | 14746 | 14770 | 14796 | 14812 | 14820 | 14826 | 14842 |
| 14850 | 14866 | 14868 | 14890 | 14922 | 14938 | 14946 | 14956 | 15012 | 15052 |
| 15060 | 15076 | 15082 | 15090 | 15100 | 15106 | 15130 | 15138 | 15148 | 15172 |
| 15186 | 15226 | 15258 | 15268 | 15298 | 15330 | 15348 | 15372 | 15412 | 15426 |
| 15442 | 15460 | 15580 | 15628 | 15660 | 15666 | 15682 | 15730 | 15738 | 15748 |
| 15772 | 15786 | 15796 | 15802 | 15858 | 15906 | 15922 | 15970 | 16066 | 16068 |
| 16138 | 16186 | 16188 | 16228 | 16252 | 16300 | 16332 | 16338 | 16348 | 16362 |
| 16380 | 16420 | 16426 | 16452 | 16476 | 16492 | 16546 | 16572 | 16602 | 16618 |
| 16650 | 16692 | 16746 | 16762 | 16786 | 16828 | 16842 | 16882 | 16900 | 16930 |
| 16962 | 16978 | 16980 | 17010 | 17020 | 17026 | 17052 | 17076 | 17092 | 17098 |
| 17122 | 17188 | 17202 | 17298 | 17316 | 17332 | 17386 | 17388 | 17442 | 17476 |
| 17482 | 17508 | 17572 | 17578 | 17596 | 17626 | 17668 | 17746 | 17748 | 17788 |
| 17826 | 17836 | 17850 | 17890 | 17908 | 17922 | 17938 | 17956 | 17980 | 17988 |
| 18012 | 18042 | 18058 | 18076 | 18148 | 18180 | 18228 | 18250 | 18268 | 18412 |
| 18426 | 18442 | 18460 | 18492 | 18586 | 18636 | 18700 | 18730 | 18748 | 18756 |
| 18772 | 18786 | 18858 | 18868 | 18898 | 18916 | 18946 | 18972 | 18978 | 19012 |
| 19036 | 19050 | 19068 | 19138 | 19140 | 19156 | 19162 | 19180 | 19218 | 19236 |
| 19258 | 19300 | 19332 | 19372 | 19378 | 19386 | 19402 | 19426 | 19468 | 19482 |
| 19500 | 19506 | 19540 | 19570 | 19596 | 19602 | 19660 | 19708 | 19716 | 19738 |
| 19762 | 19812 | 19852 | 19866 | 19890 | 19948 | 19962 | 19972 | 19978 | 19996 |
| 20028 | 20050 | 20106 | 20116 | 20122 | 20148 | 20172 | 20218 | 20260 | 20268 |
| 20322 | 20340 | 20356 | 20442 | 20476 | 20506 | 20508 | 20532 | 20548 | 20610 |
| 20626 | 20692 | 20716 | 20730 | 20748 | 20770 | 20772 | 20788 | 20898 | 20938 |
| 20962 | 20980 | 21010 | 21012 | 21018 | 21058 | 21066 | 21100 | 21106 | 21138 |

*FIG. 1B* (CONT.)

| | | | | | | | | | |
|---|---|---|---|---|---|---|---|---|---|
| 21156 | 21162 | 21178 | 21186 | 21210 | 21220 | 21226 | 21268 | 21316 | 21340 |
| 21346 | 21378 | 21396 | 21418 | 21466 | 21490 | 21492 | 21522 | 21556 | 21562 |
| 21586 | 21588 | 21610 | 21612 | 21660 | 21682 | 21700 | 21738 | 21772 | 21802 |
| 21820 | 21858 | 21892 | 22002 | 22012 | 22036 | 22066 | 22090 | 22108 | 22122 |
| 22132 | 22156 | 22170 | 22188 | 22228 | 22258 | 22276 | 22282 | 22306 | 22348 |
| 22396 | 22468 | 22482 | 22500 | 22530 | 22548 | 22612 | 22618 | 22620 | 22636 |
| 22642 | 22668 | 22690 | 22708 | 22716 | 22738 | 22786 | 22852 | 22858 | 22860 |
| 22876 | 22900 | 22972 | 23002 | 23020 | 23026 | 23028 | 23052 | 23098 | 23116 |
| 23188 | 23196 | 23250 | 23332 | 23338 | 23356 | 23370 | 23458 | 23508 | 23530 |
| 23538 | 23548 | 23562 | 23602 | 23626 | 23628 | 23668 | 23740 | 23746 | 23788 |
| 23812 | 23818 | 23826 | 23868 | 23898 | 23908 | 23916 | 23956 | 24018 | 24028 |
| 24042 | 24076 | 24082 | 24106 | 24108 | 24178 | 24196 | 24202 | 24228 | 24316 |
| 24370 | 24378 | 24412 | 24418 | 24442 | 24498 | 24508 | 24532 | 24546 | 24658 |
| 24676 | 24682 | 24690 | 24708 | 24732 | 24748 | 24762 | 24780 | 24820 | 24850 |
| 24858 | 24906 | 24916 | 24922 | 24970 | 24978 | 24988 | 25012 | 25036 | 25146 |
| 25162 | 25188 | 25218 | 25228 | 25236 | 25242 | 25252 | 25306 | 25348 | 25356 |
| 25372 | 25452 | 25468 | 25522 | 25540 | 25578 | 25588 | 25602 | 25642 | 25666 |
| 25692 | 25716 | 25732 | 25746 | 25770 | 25866 | 25930 | 25932 | 25996 | 26002 |
| 26020 | 26052 | 26098 | 26106 | 26140 | 26170 | 26188 | 26236 | 26250 | 26260 |
| 26266 | 26308 | 26338 | 26356 | 26386 | 26458 | 26500 | 26538 | 26556 | 26572 |
| 26596 | 26626 | 26668 | 26682 | 26692 | 26698 | 26716 | 26722 | 26812 | 26820 |
| 26860 | 26946 | 26986 | 27010 | 27042 | 27058 | 27060 | 27066 | 27076 | 27090 |
| 27106 | 27178 | 27196 | 27252 | 27258 | 27298 | 27396 | 27436 | 27508 | 27538 |
| 27580 | 27610 | 27652 | 27700 | 27732 | 27772 | 27778 | 27802 | 27826 | 27850 |
| 27892 | 27900 | 27916 | 27940 | 27946 | 28018 | 28026 | 28050 | 28098 | 28108 |
| 28122 | 28162 | 28180 | 28210 | 28228 | 28276 | 28282 | 28306 | 28308 | 28348 |
| 28386 | 28410 | 28428 | 28476 | 28492 | 28498 | 28516 | 28540 | 28546 | 28548 |
| 28570 | 28572 | 28578 | 28596 | 28602 | 28618 | 28642 | 28660 | 28722 | 28770 |
| 28812 | 28836 | 28842 | 28858 | 28908 | 28932 | 28948 | 28978 | 29020 | 29026 |
| 29058 | 29076 | 29100 | 29122 | 29130 | 29146 | 29172 | 29220 | 29242 | 29250 |
| 29332 | 29338 | 29362 | 29386 | 29388 | 29410 | 29428 | 29436 | 29442 | 29452 |
| 29482 | 29500 | 29530 | 29572 | 29586 | 29668 | 29716 | 29722 | 29740 | 29788 |
| 29836 | 29850 | 29866 | 29916 | 29988 | 30010 | 30012 | 30028 | 30058 | 30108 |
| 30138 | 30180 | 30196 | 30202 | 30210 | 30252 | 30292 | 30306 | 30322 | 30340 |
| 30346 | 30388 | 30466 | 30468 | 30490 | 30508 | 30516 | 30538 | 30556 | 30636 |
| 30642 | 30660 | 30676 | 30706 | 30762 | 30780 | 30802 | 30828 | 30850 | 30852 |
| 30858 | 30868 | 30892 | 30930 | 30940 | 30970 | 31012 | 31018 | 31068 | 31090 |
| 31138 | 31146 | 31180 | 31252 | 31258 | 31266 | 31276 | 31306 | 31356 | 31378 |
| 31386 | 31396 | 31468 | 31516 | 31530 | 31546 | 31642 | 31666 | 31698 | 31858 |
| 31882 | 31890 | 31906 | 31956 | 31962 | 31972 | 32002 | 32026 | 32028 | 32058 |
| 32068 | 32076 | 32082 | 32098 | 32116 | 32140 | 32188 | 32202 | 32212 | 32236 |
| 32260 | 32308 | 32322 | 32340 | 32362 | 32370 | 32380 | 32410 | 32442 | 32466 |
| 32490 | 32506 | 32530 | 32532 | 32562 | 32572 | 32586 | 32602 | 32652 | 32692 |
| 32716 | 32748 | 32770 | 32788 | 32796 | 32842 | 32908 | 32916 | 32932 | 32938 |
| 32940 | 32986 | | | | | | | | |

*FIG. 1C* (CONT.)

CIRCUIT FOR DETERMINING MULTIPLICATIVE INVERSES IN CERTAIN GALOIS FIELDS

FIELD OF INVENTION

This invention relates to data error correction systems, and in particular to Galois Field division operations performed by the systems.

BACKGROUND OF THE INVENTION

The importance of error correction coding of data in digital computer systems has increased greatly as the density of the data recorded on mass storage media, more particularly magnetic disks, has increased. With higher recording densities, a tiny imperfection in the recording surface of a disk can corrupt a large amount of data. In order to avoid losing that data, error correction codes ("ECC's") are employed to, as the name implies, correct the erroneous data.

Before a string of data symbols is recorded on a disk, it is mathematically encoded to form ECC symbols. The ECC symbols are then appended to the data string to form code words—data symbols plus ECC symbols—and the code words are then stored on the disk. When the stored data is to be accessed from the disk, the code words containing the data symbols are retrieved from the disk and mathematically decoded. During decoding any errors in the data are detected and, if possible, corrected through manipulation of the ECC symbols [For a detailed description of decoding see Peterson and Weldon, Error Correction Codes, 2d Edition, MIT Press, 1972].

Stored digital data can contain multiple errors. One of the most effective types of ECC used for the correction of multiple errors is a Reed-Solomon code [For a detailed description of Reed-Solomon codes, see Peterson and Weldon, Error Correction Codes]. With Reed-Solomon codes, the encoding and decoding operations are performed over a Galois Field, using Galois Field addition, multiplication and division operations.

Galois Field division is generally a time consuming operation that significantly lengthens the ECC encoding and decoding processes. The time it takes to perform error correction operations adversely affects the rate at which data can be retrieved from a storage device and supplied to a user or to a computer application that requires the data.

One way to perform a Galois Field division operation, B/A, where A and B are elements of the Galois Field $GF(2^Q)$, is to determine the multiplicative inverse of A and multiply B by the inverse. Finding the inverse of a Galois Field element is not particularly straight forward. One solution to determining the inverse is to test each element of the field, by multiplying the element by B. This is very time consuming, particularly with the larger Galois Fields that are used to protect the higher-density data.

Another solution is to use a look-up table that contains the inverses. If a Galois Field $GF(2^{2M})$ is used, a $(2^{2M}-1)$-element look-up table is required. With many systems, it is undesirable to have such large look-up tables, which require both large amounts of storage space and relatively complex addressing circuitry.

A better solution is described in U.S. Pat. No. 4,975,876, which has a common inventor and is incorporated herein by reference. The system described in the '876 patent determines the multiplicative inverse of an element A of $GF(2^{2M})$ by first computing a conversion factor, $D=A^{2^M}$, and then multiplying A by D to produce an associated element $C=A^{2^M+1}$. The element C is also an element of a smaller Galois Field, $GF(2^M)$, which is a subfield of $GF(2^{2M})$. The system then determines the multiplicative inverse of C by entering a $(2^M-1)$-element look-up table. The system next converts the inverse of C, $C^{-1}=A^{-(2^M+1)}$, to the multiplicative inverse of A by multiplying $C^{-1}$ by the conversion factor D, to produce $A^{-(2^M+1)} * A^{2^M+1} = A^{-1}$, where "*" represents Galois Field multiplication.

The system described in the '876 patent works well and determines the multiplicative inverse of A relatively quickly, using a $(2^M-1)$-entry look-up table rather than the larger $(2^{2M}-1)$-entry table. The system, however, requires at least one relatively complex full Galois Field multiplier to multiply together two 2M-bit symbols. A single multiplier may be used multiple times to multiply together A and D, and then $C^{-1}$ and D, or two of the multipliers may be used to perform the two multiplications. The multiplication operations, whether performed by one or two full Galois Field multipliers, involve manipulation of two 2M-bit symbols and are thus both relatively time consuming and complex. The system must also hold the 2M-bit conversion factor D that is used to produce C, until $C^{-1}$ is retrieved from the look-up table.

We have devised an improved system that, for selected Galois Fields $GF(2^{2M})$ where 2M+1 is prime, produces the multiplicative inverse of A in fewer clock cycles. Further, the improved system uses less complex circuitry than the system of the '876 patent. We discuss the improved system below.

SUMMARY OF THE INVENTION

For selected Galois Fields $GF(2^{2M})$, the improved system performs a Galois Field division of two elements B/A by first producing a multiplicative inverse of A, where A is represented by a (2M+1)-bit symbol, and then multiplying B by $A^{-1}$, preferably using a (2M+1)-bit symbol for B.

The system directly converts the (2M+1)-bit representation of A to an associated element $C=A^{2^M+1}$ that is also an element of the subfield $GF(2^M)$. As discussed in more detail below, $A^{2^M}$ is produced by permuting the (2M+1) bits of A, and C is produced by multiplying A by the permuted bits. The multiplication is simplified, however, because of the duplication of bits between A and $A^{2^M}$, and the multiplier produces only M+1 bits to represent the 2M+1 bits of C. Accordingly, the multiplier performs fewer bit manipulations, and is less complex and faster than a full Galois Field multiplier. Indeed, the permutation of the bits to produce $A^{2^M}$ is incorporated directly into the bit manipulations and need not be performed as a separate operation, as is done in the prior system. Further, there is no need to retain the quantity $A^{2^M}$ for a later multiplication operation, since the quantity is readily produced by permuting the 2M+1 bits of A.

The M+1 bits that represent C are used to enter a $(2^M-1)$-entry look-up table that contains the multiplicative inverse of C. The multiplicative inverse, $C^{-1}$, is also represented by M+1 bits, and thus, the amount of storage space required for each entry of the table is reduced from 2M bits to M+1 bits. The (M+1)-bit representation of $C^{-1}$ is then converted to the multiplicative inverse $A^{-1}$ by multiplying the M+1 bits by the (2M+1)-bit representation of $A^{2^M}$. As discussed, the quantity $A^{2^M}$ is produced, without delay, by permuting the 2M+1 bits of A.

The multiplier that produces $A^{-1}$ multiplies the 2M+1 permuted bits by M+1 bits, and thus, performs approximately one-half of the bit manipulations that are performed by a full Galois Field multiplier that multiplies two 2M-bit symbols. Accordingly, the multiplier is less complex and faster than the full multiplier.

The multiplicative inverse $A^{-1}$ is next multiplied by B to produce the quotient B/A. The system preferably represents B by a (2M+1)-bit symbol and performs the multiplication by exclusive-OR'ing cyclically shifted copies of B, as discussed in more detail below.

BRIEF DESCRIPTION OF THE DRAWINGS

The invention description below refers to the accompanying drawings, of which:

FIG. 1 is a table of selected values of m=2M;

DETAILED DESCRIPTION OF AN ILLUSTRATIVE EMBODIMENT

1. Field Operations

Figure 2:
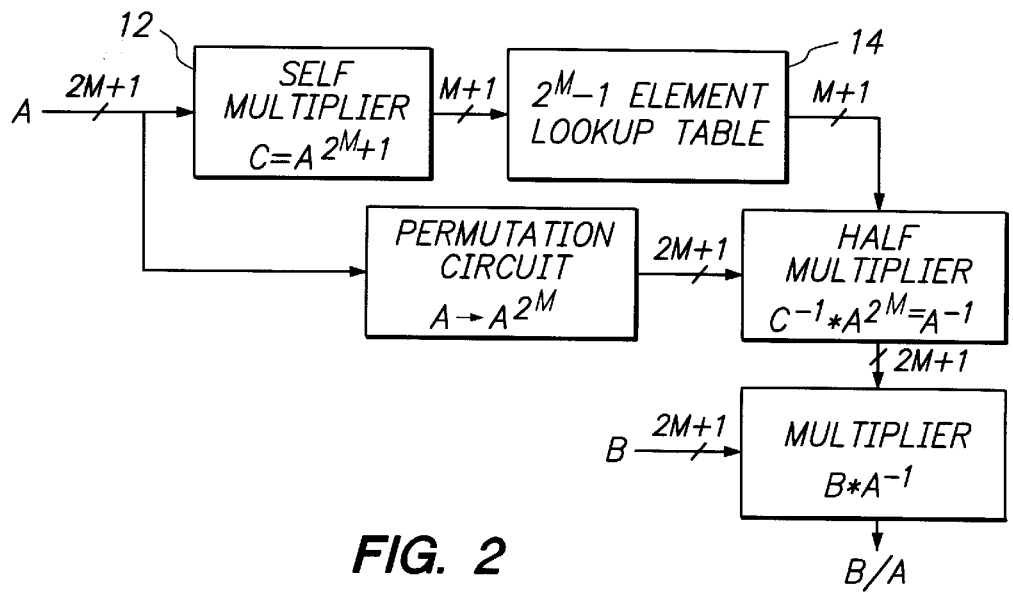
FIG. 2 is a functional block diagram of a system constructed in accordance with the current invention.

Selected Galois Fields, $GF(2^{2M})$, where 2M+1 is prime and 2 is a primitive element of GF(2M+1), are generated by an irreducible polynomial $$p(x)=x^{2M}+x^{2M-1}+\ldots+x^2+x+1$$

and are discussed in a paper by J. K. Wolf entitled "*Efficient Circuits For Multiplying in $GF(2^m)$ For Certain Values of m*", published in *Discrete Mathematics* 106/107 (1992) pp. 497–502, which is incorporated herein by reference. The first few values of 2M are 2, 4, 10, 12 . . . and thus the first few fields are $GF(2^2)$, $GF(2^4)$, $GF(2^{10})$ and so forth. FIG. 1 is a table of selected values of m=2M, for m<32,987.

Each element of the selected Galois Fields $GF(2^{2M})$ may be represented by a degree 2M polynomial, that is, by a (2M+1)-bit symbol. Each element is thus associated with two distinct, but related symbols b(x) and c(x), where $$b(x)+c(x)=p(x)$$

The symbols b(x) and c(x) are thus complements.

For M=5, each of the (2M)-bit, or 10-bit, elements of $GF(2^{10})$ can be represented by either of two 11-bit symbols. For example:

|  | 10-bit representation | 11-bit representation |
|---|---|---|
| "0" | 0000000000 | 00000000000 or 11111111111 |
| $\alpha^0$ | 0000000001 | 00000000001 or 11111111110 |
| $\alpha^1$ | 0000001011 | 00000001011 or 11111110100 |
| $\alpha^2$ | 0001000101 | 00001000101 or 11101110101 |
| $\alpha^3$ | 1011100111 | 01011100111 or 10100011000 |
| $\alpha^4$ | 0000010011 | 00000010011 or 11111101100 |
| $\alpha^5$ | 0010101101 | 00010101101 or 11101010010 |
| $\alpha^6$ | 1101100000 | 01101100000 or 10010011111 |
| $\alpha^7$ | 0101011100 | 00101011100 or 11010100011 |
| $\alpha^8$ | 0100000101 | 00100000101 or 11011111010 |
| $\alpha^9$ | 1100100110 | 01100100110 or 10011011001 |
| $\alpha^{10}$ | 1110100110 | 01110100110 or 10001011001 |
| ... |  |  |
| $\alpha^{1022}$ | 1000110100 | 01000110100 or 10111001000 |

The system discussed below with reference to FIGS. 2 and 3 preferably uses the (2M+1)-bit, or in the example 11-bit, symbol representations. The symbols are produced from the 2M-bit elements of $GF(2^{2M})$ by appending to an element a leading 0 bit, or by appending to the element a leading 1 bit and exclusive-OR'ing the leading bit with the remaining 2M bits.

Using the (2M+1)-bit symbols has the following advantages:

First, raising a (2M+1)-bit symbol to a power $2^K$ is a permutation of the bits of the symbol. For a symbol b(x):

$$b(x)=b_{10}x^{10}+b_9x^9+\ldots b_1x+b_0$$

represented by the coefficients, or bits, $$b(x)=b_{10}b_9b_8b_7b_6b_5b_4b_3b_2b_1b_0,$$

the coefficient $b_j$ of b(x), that is, the coefficient with position index j in b(x), is moved to the coefficient with position index $j*(2^K)$ mod 2M+1 in $b(x)^{2^K}$. For example, b(x) raised to the power $2^M$ is:

$$(b(x))^{2^M}=b_1b_2\ldots b_{2M-2}b_{2M-1}b_{2M}b_0$$

where the coefficient indices correspond to the positions of the bits in b(x). Raising a symbol to the power $2^M$ reverses the positions of all of the bits except $b_0$.

Second, the multiplication of two (2M +1)-bit symbols can be performed by exclusive-OR'ing cyclically shifted copies of one of the symbols with the coefficients, or bits, of the other symbol. For two 11-bit symbols b(x) and d(x), where $$b(x)=b_{10}b_9b_8b_7b_6b_5b_4b_3b_2b_1b_0$$

and $$d(x)=d_{10}d_9d_8d_7d_6d_5d_4d_3d_2d_1d_0,$$

The product b(x)*d(x)=

$$b_0*(d_{10}d_9d_8d_7d_6d_5d_4d_3d_2d_1d_0)$$

$$+b_1*(d_9d_8d_7d_6d_5d_4d_3d_2d_1d_0d_{10})$$

$$+b_2*(d_8d_7d_6d_5d_4d_3d_2d_1d_0d_{10}d_9)$$

$$+b_3*(d_7d_6d_5d_4d_3d_2d_1d_0d_{10}d_9d_8)$$

$$+b_4*(d_6d_5d_4d_3d_2d_1d_0d_{10}d_9d_8d_7)$$

$$+b_5*(d_5d_4d_3d_2d_1d_0d_{10}d_9d_8d_7d_6)$$

$$+b_6*(d_4d_3d_2d_1d_0d_{10}d_9d_8d_7d_6d_5)$$

$$+b_7*(d_3d_2d_1d_0d_{10}d_9d_8d_7d_6d_5d_4)$$

$$+b_8*(d_2d_1d_0d_{10}d_9d_8d_7d_6d_5d_4d_3)$$

$$+b_9*(d_1d_0d_{10}d_9d_8d_7d_6d_5d_4d_3d_2)$$

$$+b_{10}*(d_0d_{10}d_9d_8d_7d_6d_5d_4d_3d_2d_1)$$

where "*" represents multiplication over GF(2). Note that the components of d(x) of each row above are cyclically shifted copies of each other. The symbols b(x) and d(x) can be interchanged, to achieve the same result.

2. The System

As discussed in U.S. Pat. No. 4,975,876, which is incorporated herein by reference, a quotient B/A, where B and A are elements of $GF(2^{2M})$ is calculated by first determining the multiplicative inverse of A. Accordingly, the element $\alpha^i$=A of $GF(2^{2M})$ is converted into an element $C=A^{2^M+1}$, which is also an element of the subfield $GF(2^M)$. The multiplicative inverse of C is retrieved from a $(2^M-1)$-entry look-up table, and the inverse, $C^{-1}=A^{-(2^M+1)}$, is then converted to $A^{-1}$ by multiplying $C^{-1}$ by $A^{2^M}$. The quotient B/A is calculated as $B*A^{-1}$.

We discuss using a $2^M-1$ entry look-up table to determine the multiplicative inverse of the element C, which is also an element of $GF(2^M)$. For larger values of M, however, other conventional methods may be used to determine the inverse of C in $GF(2^M)$, to avoid having to store a large look-up table. Regardless of the method used to determine $C^{-1}$, the inverse will be determined in significantly less time than it would take to find directly the inverse of A in $GF(2^{2M})$.

The prior system uses 2M-bit symbols. The current system uses (2M+1)-bit symbols over the selected Galois Fields, and over these fields can more quickly determine $A^{-1}$, and thus, $B*A^{-1}$, using less complex circuitry, as discussed below.

Figure 3:
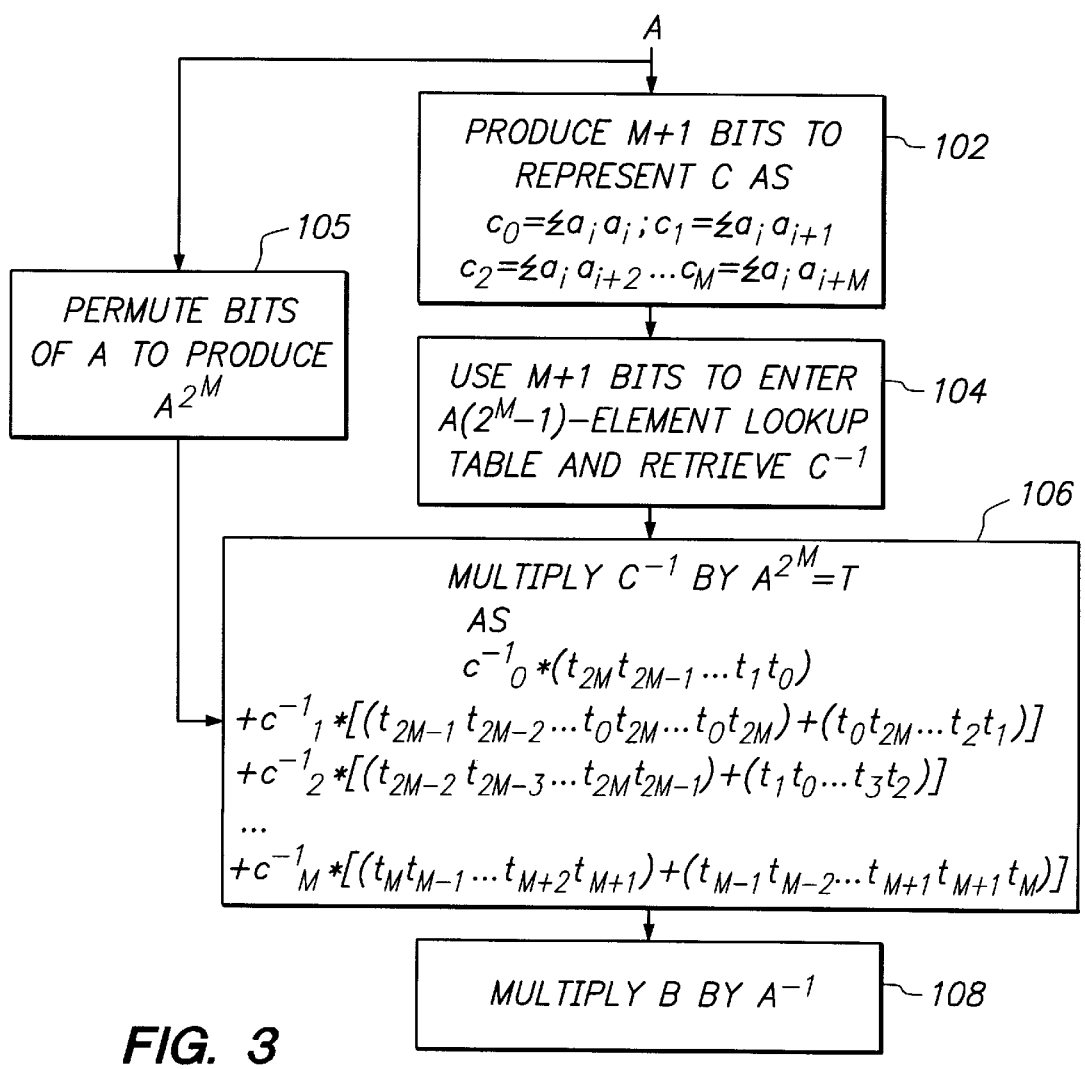
FIG. 3 is a flow chart of the operations of the system of FIG. 2.

Referring now to FIGS. 2 and 3, an element $\alpha^i=A$ of $GF(2^{2M})$, which is represented by a (2M+1)-bit symbol, is supplied to a "self-multiplier" 12. The self-multiplier produces an (M+1)-bit representation of $C=A^{2^M+1}$ where C is an element of the sub-field $GF(2^M)$.

As discussed above, raising the (2M+1)-bit symbol for A to the power $2^M$ is performed as a permutation. For $A=a_{2M}x^{2M}+a_{2M-1}x^{2M-1}+\ldots+a_2x^2+a_1x+a_0$ the coefficients $a_j$, where the index j corresponds to the bit position in A, are moved to coefficients with the index $j*2^M$ mod 2M+1. Accordingly, $A^{2^M}$ is:

$$a_1x^{2M}+a_2x^{2M-1}+\ldots+a_{2M-1}x^2+a_{2M}x+a_0$$

or $$a_1a_2a_3\ldots a_{2M-1}a_{2M}a_0.$$

The element C, which is $(A^{2^M})*A=A^{2^M+1}$, is then:

$$(a_1a_2\ldots a_{2M-1}a_{2M}a_0)*(a_{2M}a_{2M-1}\ldots a_2a_1a_0).$$

Multiplication of two (2M+1)-bit symbols is performed by exclusive-OR'ing cyclically shifted copies of one of the symbols. Accordingly, $C=(A^{2^M+1})*A$ is:

$$a_0*(a_{2M}a_{2M-1}\ldots a_2a_1a_0)$$

$$+a_{2M}*(a_{2M-1}a_{2M-2}\ldots a_1a_0a_{2M})$$

$$+a_{2M-1}*(a_{2M-2}a_{2M-3}\ldots a_0a_{2M}a_{2M-1})$$

$$+a_M*(a_{M-1}a_{M-2}\ldots a_{M+2}a_{M+1}a_M)$$

$$a_{M-1}*(a_{M-2}a_{M-3}\ldots a_{M+1}a_Ma_{M-1})$$

$$+a_2*(a_1a_0\ldots a_4a_3a_2)+a_1*(a_0a_{2M}\ldots a_3a_2a_1)$$

with the corresponding terms of the products exclusive-OR'd together to form the coefficients of C. Accordingly:

$$c_0=a_0a_0+a_{2M}a_{2M}+a_{2M-1}a_{2M-1}+\ldots+a_2a_2+a_1a_1$$

$$c_1=a_0a_1+a_{2M}a_0+a_{2M-1}a_{2M}+\ldots+a_2a_3+a_1a_2$$

$$c_2=a_0a_2+a_{2M}a_1+a_{2M-1}a_0+\ldots+a_2a_4+a_1a_3$$

$$c_M=a_0a_M+a_{2M}a_{M-1}+a_{2M-1}a_{M-2}+\ldots+a_2a_{M+2}+a_1a_{M+1}$$

$$c_{M+1}=a_0a_{M+1}+a_{2M}a_M+a_{2M-1}a_{M-1}+\ldots+a_2a_{M-2}+a_1a_{M+1}$$

$$c_{2M-1}=a_0a_{2M-1}+a_{2M}a_{2M-2}+a_{2M-1}a_{2M-3}\ldots+a_2a_0+a_1a_{2M}$$

$$c_{2M}=a_0a_{2M}+a_{2M}a_{2M-1}+a_{2M-1}a_{2M-2}+\ldots+a_2a_1+a_1a_0$$

The coefficient $c_0=\Sigma a_ia_i$ for $i=0, 1\ldots 2M$ with the indices of the two $a_j$'s in each term of the sum differing by zero. The coefficient $c_1=\Sigma a_ia_{i+1}$ for $i=0, 1\ldots 2M$ with the indices of the two $a_j$'s of each term of the sum differing by one; coefficient $c_2=\Sigma a_ia_{i+2}$ for $i=0, 1\ldots 2M$ with the indices of the two $a_j$'s of each term of the sum differing by two, and so forth, and $c_{2M}=\Sigma a_ia_{i+2M}$ for $i=0, 1\ldots 2M$, with indices of the two $a_j$'s of each term of the sum differing by 2M. The indices are mod 2M+1, and thus, the indices of the $a_j$'s of the coefficient $c_{2M}$ differ by one and $c_{2M}=c_1$. Similarly, the coefficient $c_{2M-1}=c_2$, the coefficient $c_{2M-2}=c_3$ and so forth and the coefficient $c_{M+1}=c_M$. The coefficients $c_1$ to $c_{2M}$ are thus symmetrical about $c_M$, and C is can be written as:

$$c_1c_2\ldots c_{m-1}c_Mc_Mc_{M-1}\ldots c_2c_1c_0.$$

Accordingly, only M+1 bits are required to represent C, namely, $c_Mc_{M-1}\ldots c_1c_0$, with the remaining M bits, that is, the higher order bits, being bits $c_1$ through $c_M$.

The self-multiplier 12 produces (step 102) the coefficients $c_M$ to $c_0$ directly from A, as the M+1 sums:

$$\Sigma a_ia_{i+M}; \Sigma a_ia_{i+M-1}; \ldots; \Sigma a_ia_{i+2}; \Sigma a_ia_{i+1}; \Sigma a_ia_i$$

for $i=0, 1\ldots 2M$, and need not produce the remaining M coefficients. The self-multiplier thus produces C using fewer bit manipulations, and with less complex circuitry, than the prior system. Indeed, the prior system uses a dedicated circuit to produce $A^{2^M}$ and a full Galois Field multiplier to then multiply $A^{2^M}$ by A.

The M+1 coefficients of C are used to enter a $(2^M-1)$-entry look-up table 14, to retrieve the multiplicative inverse of C (step 104). The table produces an (M+1)-bit symbol that represents the coefficients $c^{-1}_M$ to $c^{-1}_0$ of $C^{-1}$.

The M+1 bits retrieved from the table 14 are supplied to a "half-multiplier" 16, which produces the product $C^{-1}*A^{2^M}=A^{-(2^M+1)}*A^{2^M}=A^{-1}$. As discussed above, the symbol $A^{2^M}$ is produced by permuting the bits of A. In the system 10 the bits are permuted in a permutation circuit 18 that produces, with essentially no delay, $A^{2^M}=a_1a_2\ldots a_{2M-1}a_{2M}a_0$(step 105).

To explain the operations of the half-multiplier 16, we refer below to $A^{2^M}$ as T, which has coefficients $t_{2M}t_{2M-1}\ldots t_1t_0$. If all 2M+1 bits of $C^{-1}$ are used, $T*C^{-1}$ is:

$$(c^{-1}_0c^{-1}_2\ldots c^{-1}_{M-1}c^{-1}_Mc^{-1}_{M-1}\ldots c^{-1}_1c^{-1}_0)*(t_{2M}t_{2M-1}t_{M+1}t_Mt_{M-1}\ldots t_1t_0)$$

or $$c^{-1}_0(t_{2M}t_{2M-1}\ldots t_1t_0)$$

$$+c^{-1}_1(t_{2M-1}t_{2M-2}\ldots t_0t_{2M})$$

$$+c^{-1}_2(t_{2M-2}t_{2M-3}\ldots t_{2M}t_{2M-1})$$

$$+c^{-1}_M(t_Mb_{M-1}\ldots t_{M+1})$$

$$+c^{-1}_M(t_Mb_{M-1}\ldots t_{M+1})$$

$$+c^{-1}_2(t_2t_1\ldots t_4t_3)$$

$$+c^{-1}_1(t_1t_0\ldots t_3t_2)$$

Combining like terms, the product is:

$$c^{-1}_0*(t_{2M}t_{2M-1}\ldots t_1t_0)$$

$$+c^{-1}_1*[(t_{2M-1}t_{2M-2}\ldots t_0t_{2M})+(t_0t_{2M}\ldots t_2t_1)]$$

$$+c^{-1}_2*[(t_{2M-2}t_{2M-3}\ldots t_{2M}t_{2M-1})+(t_1t_0\ldots t_3t_2)]$$

$$+c^{-1}_M*[(t_Mt_{M-1}\ldots t_{M+2}t_{M+1})+(t_{M-1}t_{M-2}\ldots t_{M+1}t_M)].$$

Accordingly, the half-multiplier 16 produces $T*C^{-1}$ by combining the corresponding bits of the M+1 sets of sums and products set forth above (step 106). The half-multiplier thus performs essentially one-half of the bit manipulations that are performed by a full Galois Field multiplier that multiplies together two 2M-bit symbols.

The 2M+1 bits of $A^{-1}$ are next supplied to a multiplier 18, which produces the product $B*A^{-1}$, using a (2M+1)-bit representation for B (step 108). The product $B*A^{-1}$ is thus produced by exclusive-OR'ing up to 2M+1 cyclically shifted copies of B. To further simplify the multiplication operation, the lower weight representations of $A^{-1}$ and/or B may be used.

As discussed, the multipliers of the current system are each less complex than their counterparts in the prior system. Further, the self-multiplier and the half-multiplier produce their respective products $A^{2^M+1}$ and $A^{-1}$ in fewer clock cycles than their counterpart circuits. Also, the system uses fewer bits to address the look-up table, and passes fewer bits between system components than the prior system. Accordingly, the system 10 is an improvement in both time and complexity over the prior system for the selected Galois Field. The system 10 may be used only with the selected Galois Fields, however, and the prior system is preferably used for the remaining Galois Fields.

If a further reduction in the number of bits used to enter the look-up table 14 is desired, the self-multiplier 12 produces M bits to represent C by adding, for example, the bit $c_1$ to each of the other bits. The symbol C can then be represented by $c_0+c_1, c_2+c_1 \ldots c_M+c_1$, without using the bit $c_1+c_1$, which is known to be a zero. The look-up table may similarly store the multiplicative inverses of C with M coefficients that each have the value of $c_1$ added therein, or may store them as (M+1)-bit representations, and avoid having to manipulate the bits to reproduce $c_M c_{M-1} \ldots c_0$.

The foregoing description has been limited to a specific embodiment of this invention. It will be apparent, however, that variations and modifications, such as the use of various configurations of shift registers to perform the cyclic shifting operations, the performing of various operations in software, hardware or firmware, or the combining of various single-purpose processors into one or more multi-purpose processors, may be made to the invention, with the attainment of some or all of its advantages. Therefore, it is the object of the appended claims to cover all such variations and modifications as come within the true spirit and scope of the invention.

What is claimed is:

1. A method for correcting errors in a code word encoded over a Galois Field $GF(2^{2M})$ and 2M+1 is prime, the method including the steps of:
   A. decoding the codeword and performing Galois Field division operations involving Galois Field elements B and A by
      i. representing A as a (2M+1)-bit symbol;
      ii. producing an (M+1)-bit representation of an element $C=A^{2^{M+1}}$ by calculating $c_0 = \Sigma a_i a_i$ $c_1 = \Sigma a_i a_{i+1}$ $c_2 = \Sigma a_i a_{i+2}$ $c_M \Sigma = a_i a_{i+M}$ where the $a_j$'s are coefficients of a (2M+1)-bit representation of A and the $c_j$'s are coefficients of C;
      iii. using the M+1 bits representing C to determine $C^{-1}$;
      iv. multiplying $C^{-1}$ by $A^{2^M}$;
      v. multiplying $A^{-1}$ by B; and B. determining the locations of errors in the code word using the quotients B/A.

2. The method of claim 1 wherein the step of determining $C^{-1}$ includes using the M+1 bits to enter a $(2^M-1)$-element look-up table and retrieve $C^{-1}$.

3. The method of claim 1 wherein the step of multiplying $C^{-1}$ by $A^{2^M}$ includes
   i. producing $A^{2^M}$ as a permutation of the (2M+1)-bit symbol representing A, and
   ii. multiplying $A^{2^M}$ by the (M+1)-bit representation of $C^{-1}$.

4. The method of claim 3 wherein the step of multiplying $A^{2^M}$ by $C^{-1}$ includes exclusive-OR'ing up to M+1 sums of cyclically shifted copies of $A^{2^M}$.

5. The method of claim 4 wherein the step of multiplying $A^{-1}$ and B includes
   iii. representing B with a (2M+1)-bit symbol; and
   iv. exclusive-OR'ing up to 2M+1 cyclically shifted copies of B.

6. The method of claim 1, wherein the step of determining $C^{-1}$ includes using M bits $c_0+c_1, c_2+c_1, \ldots, c_M+c_1$ to enter a $(2^M-1)$-element lookup table and retrieve $C^{-1}$.

7. The method of claim 6 wherein the $C^{-1}$ retrieved from the look-up table includes M bits and the step of determining $C^{-1}$ further includes manipulating the M bits to produce an (M+1)-bit representation of $C^{-1}$.

8. The method of claim 6 wherein the $C^{-1}$ retrieved from the look-up table includes M+1 bits.

9. A system for producing a quotient B/A where B and A are elements of $GF(2^{2M})$ and 2M+1 is prime, the system including:
   A. a self-multiplier for producing M+1 bits representing $C=A^{2^M+1}$ as $c_0 = \Sigma a_i a_i$ $c_1 = \Sigma a_i a_{i+1}$ $c_2 = \Sigma a_i a_{i+2}$ $c_M = \Sigma a_i a_{i+M}$ where the $a_j$'s are coefficients of a (2M+1)-bit representation of A and the $c_j$'s are coefficients of C;
   B. a $(2^M-1)$-element look-up table for storing multiplicative inverses of C;
   C. a half-multiplier for multiplying a (2M+1)-bit representation of $A^{2^M}$ by the $C^{-1}$ retrieved from the look-up table to produce $A^{-1}$;
   D. a multiplier for multiplying $A^{-1}$ by B.

10. The system of claim 9 further including a permutation circuit for permuting the 2M+1 bits of A to produce $A^{2^M}$, the permutation circuit supplying the permuted bits to the half-multiplier.

11. The system of claim 10 wherein the half-multiplier produces $A^{-1}$ by multiplying the 2M+1 bits of $A^{2^M}$ by an (M+1)-bit representation of $C^{-1}$.

12. The system of claim 11 wherein the half-multiplier produces $A^{-1}$ as $c^{-1}_0 * (t_{2M} t_{2M-1} \ldots t_1 t_0)$ $+ c^{-1}_1 * [(t_{2M-1} t_{2M-2} \ldots t_0 t_{2M}) + (t_0 t_{2M} \ldots t_2 t_1)]$ $+ c^{-1}_2 * [(t_{2M-2} t_{2M-3} \ldots t_{2M} t_{2M-1}) + (t_1 t_0 \ldots t_3 t_2)]$ $+ c^{-1}_M * [(t_M t_{M-1} \ldots t_{M+2} t_{M+1}) + (t_{M-1} t_{M-2} \ldots t_{M+1} t_M)]$.

where $t_{2M} t_{2M-1} \ldots t_1 t_0$ are the bits of $A^{2^M}$.

13. The system of claim 9 wherein the multiplier that multiplies B by $A^{-1}$ uses a (2M+1)-bit representation of B.

14. The system of claim 9 wherein:
   i. the self-multiplier includes means for producing an M-bit representation of C, the means adding to each of the M+1 bits a coefficient $c_k$, where $0<k\leq M$ and using $c_0+c_k$, $c_1+c_k$ ... $c_M+c_k$ and omitting $c_k+c_k$ which is known to be zero; and
   ii. the look-up table is addressed by the M-bit representation.

15. The system of claim 14 wherein the look-up table holds M-bit representations of $C^{-1}$.

16. A system for producing a quotient B/A where B and A are elements of $GF(2^{2M})$ and 2M+1 is prime, the system including:
   A. a self-multiplier for producing M+1 bits representing $C=A^{2^M+1}$ as $c_0 = \Sigma a_i a_i$ $c_1 = \Sigma a_i a_{i+1}$ $c_2 = \Sigma a_i a_{i+2}$ $c_M = \Sigma a_i a_{i+M}$ where the $a_j$'s are coefficients of a (2M+1)-bit representation of A and the $c_j$'s are coefficients of C;
   B. means for determining $C^{-1}$ in $GF(2^M)$;
   C. a half-multiplier for multiplying a (2M+1)-bit representation of $A^{2^M}$ by the $C^{-1}$ to produce $A^{-1}$;
   D. a multiplier for multiplying $A^{-1}$ by B.

17. The system of claim 16 wherein the means for determining $C^{-1}$ is a $(2^M-1)$-element look-up table.

18. The system of claim 16 further including a permutation circuit for permuting the 2M+1 bits of A to produce $A^{2^M}$, the permutation circuit supplying the permuted bits to the half-multiplier.

19. The system of claim 16 wherein the multiplier that multiplies B by $A^{-1}$ uses a (2M+1)-bit representation of B.

20. A method for encoding data symbols over a Galois Field $GF(2^M)$ and 2M+1 is a prime, the method including the steps of
   A. encoding the data symbols and performing Galois Field division operations involving Galois Field elements B and A by
      i. representing A as a (2M+1)-bit symbol;
      ii. producing an (M+1)-bit representation of an element $C=A^{2^M+1}$ by calculating $c_0 = \Sigma a_i a_i$ $c_1 = \Sigma a_i a_{i+1}$ $c_2 = \Sigma a_i a_{i+2}$ $c_M = \Sigma a_i a_{i+M}$ where the $a_j$'s are coefficients of a (2M+1)-bit representation of A and the $c_j$'s are coefficients of C;
      iii. using the M+1 bits representing C to determine $C^{-1}$;
      iv. multiplying $C^{-1}$ by $A^{2^M}$;
      v. multiplying $A^{-1}$ by B; and
   B. producing redundancy symbols using the quotients B/A; and
   C. producing a code word using the data symbols and the redundancy symbols.

21. The method of claim 20 wherein the step of determining $C^{-1}$ includes using the M+1 bits to enter a $(2^M-1)$-element look-up table and retrieve $C^{-1}$.

22. The method of claim 20 wherein the step of multiplying $C^{-1}$ by $A^{2^M}$ includes
   i. producing $A^{2^M}$ as a permutation of the (2M+1)-bit symbol representing A, and
   ii. multiplying $A^{2^M}$ by the (M+1)-bit representation of $C^{-1}$.

23. The method of claim 22 wherein the step of multiplying $A^{2^M}$ by $C^{-1}$ includes exclusive-OR'ing up to M+1 sums of cyclically shifted copies of $A^{2^M}$.

24. The method of claim 23 wherein the step of multiplying $A^{-1}$ and B includes
   iii. representing B with a (2M+1)-bit symbol; and
   iv. exclusive-OR'ing up to 2M+1 cyclically shifted copies of B.

25. The method of claim 20, wherein the step of determining $C^{-1}$ includes using M bits $c_0+c_1, c_2+c_1, \ldots, c_M+c_1$ to enter a $(2^M-1)$-element lookup table and retrieve $C^{-1}$.

26. The method of claim 25 wherein the $C^{-1}$ retrieved from the look-up table includes M bits and the step of determining $C^{-1}$ further includes manipulating the M bits to produce an (M+1)-bit representation of $C^{-1}$.

27. The method of claim 25 wherein the $C^{-1}$ retrieved from the look-up table includes M+1 bits.

\* \* \* \* \*

UNITED STATES PATENT AND TRADEMARK OFFICE
CERTIFICATE OF CORRECTION

PATENT NO. : 6,199,088 B1
DATED : March 6, 2001
INVENTOR(S) : Weng et al.

It is certified that error appears in the above-identified patent and that said Letters Patent is hereby corrected as shown below:

<u>Column 7,</u>
Line 60, after "$c_2 = \sum a_i a_{i+2}$", insert -- ... -- on its own new line.

Line 61, replace "$c_M \sum = a_i a_{i+M}$" with -- $c_M = \sum a_i a_{i+M}$ --.

<u>Column 8,</u>
Line 38, after "$c_2 = \sum a_i a_{i+2}$", insert -- ... -- on its own new line.

Line 64, after "]", insert -- ... -- on its own new line.

<u>Column 9,</u>
Line 23, after "$c_2 = \sum a_i a_{i+2}$", insert -- ... -- on its own new line.

<u>Column 10,</u>
Line 8, after "$c_2 = \sum a_i a_{i+2}$", insert -- ... -- on its own new line.

Line 10, replace "$C_M = \sum a_i a_i +_M$" with -- $c_M = \sum a_i a_{i+M}$ --.

Signed and Sealed this

Twenty-ninth Day of July, 2003

JAMES E. ROGAN
*Director of the United States Patent and Trademark Office*